United States Patent [19]

Liddiard

[11] Patent Number: 4,708,420

[45] Date of Patent: Nov. 24, 1987

[54] FOCAL PLANE SCANNING DEVICE

[75] Inventor: Kevin Liddiard, Fairview Park, Australia

[73] Assignee: The Commonwealth of Australia, Canberra, Australia

[21] Appl. No.: 829,133

[22] PCT Filed: May 17, 1985

[86] PCT No.: PCT/AU85/00110

§ 371 Date: Jan. 14, 1986

§ 102(e) Date: Jan. 14, 1986

[87] PCT Pub. No.: WO85/05464

PCT Pub. Date: Dec. 5, 1985

[30] Foreign Application Priority Data

May 24, 1984 [AU] Australia ............... PG5164

[51] Int. Cl.⁴ ............... G02B 26/10
[52] U.S. Cl. ............... 350/6.6; 350/487
[58] Field of Search ....... 350/6.6, 619, 487; 250/332, 334, 347, 353, 338

[56] References Cited

U.S. PATENT DOCUMENTS 1,438,974 12/1922 Wente .
3,544,201 12/1970 Fowler et al. ............ 350/487
4,436,364 3/1984 Lauer et al. .

FOREIGN PATENT DOCUMENTS 0075063 3/1983 European Pat. Off. .
3035314 4/1982 Fed. Rep. of Germany .
2273292 12/1975 France .

Primary Examiner—Bruce Y. Arnold
Assistant Examiner—Loha Ben
Attorney, Agent, or Firm—Cushman, Darby & Cushman

[57] ABSTRACT

A focal plane scanning device arranged to move a mirror in an optical scanning apparatus, such as an infrared scanner, including a mirror, that is connected to a support by a central flexure member. An additional pair of flexure members are provided, each of which are attached at one end to piezoceramic drive elements and at their second ends to an adjustment bracket that bears against the rear side of the mirror. The piezoceramic drive elements are attached at their second ends to the support. When the piezoceramic members are energized, a balanced movement of the mirror about the first flexure member results.

8 Claims, 3 Drawing Figures

FOCAL PLANE SCANNING DEVICE

BACKGROUND OF THE INVENTION

Infrared detection systems which operate over the 2 to 20 μm wavelength region, and which are required to have an optical resolution of 1 mrad or less, conventionally employ either a germanium refracting objective or a catadioptric objective such as a Schmidt system. The optical system is used in conjunction with a single infrared detector or array of detectors, associated signal processing electronics, and a suitable target indicator device or display.

In order to detect targets over a substantial field of view, the small instantaneous field of view defined by the focal length of the optical system and the size of individual detectors may be optically scanned through the total search field of view. This may be achieved, for example, by means of rotating optical components which generate a line-by-line rectangular raster scan.

Alternatively, a large number of detectors may be employed without scanning, i.e. a staring focal plan array system. This technique suffers from various limitations arising from the finite spacing between adjacent detectors.

A disadvantage of refractive and catadioptric system is their high unit cost. Furthermore, optomechanical scanning techniques which employ motor-driven components moving at high speed to generate the desired search field, add to system complexity and overall cost.

SUMMARY OF THE INVENTION

The object of the present invention is the construction of a low cost optical system which incorporates a novel scanning technique to fill the gaps in optical coverage between adjacent sensors of a focal plane array of infrared detectors.

In accordance with the invention, the optical system is of the Cassegrain type, both the primary and secondary mirrors being constructed of a metal such as aluminum. The secondary mirror is caused to vibrate by means of a piezoelectric drive unit, the angular displacement of this mirror being of sufficient amplitude to scan the optical image by the desired amount at the focal plane.

Piezoelectric drive means for mirror oscillation have been proposed heretofore, see the specification of U.S. Pat. No. 4,436,364, and Offenlegungsschrift DE3035314, both by Lauer and Pfefferle, the first relating to a device comprising a pair of coplanar but oppositely actuated piezoceramic strips coupled to a mirror disposed between facing ends, the second relating to a single piezoceramic strip extending to a mirror anchored on a second flexible strip normal to the first strip to give a modular motion, in each case the mirror being carried by the piezoceramic strip or strips.

The invention comprises a focal plane scanning device arranged to move a mirror in an optical scanning device such as an infrared scanner wherein the mirror is mounted to be angularly displaced by means of a piezoelectric assembly comprising at least a piezoelectric member connected to the said mirror by means of a first flexure member to support the said mirror on a support bracket to allow the mirror to be tilted about a selected axis relative to the said support bracket and at least a piezoelectric drive element carried on the said support and connected to the said mirror, characterised by a pair of piezoceramic drive elements (4-5) arranged generally parallel to the plane of the said mirror (1) each connected at one end to the said support bracket (2) and extending in opposite direction past a first flexure member (3) which supports the said mirror (1), and by flexure members (8-9) one on the other end of each of said piezoceramic drive elements (4-5) connecting that piezoceramic member to the said mirror (1) remote from the said first flexure member (3), whereby a balanced movement of the said mirror (1) about the said first flexure member (3) results when said piezoceramic members (4-5) are oppositely energised.

BRIEF DESCRIPTION OF THE DRAWINGS

To enable the invention to be fully understood an embodiment thereof will be described with reference to the drawings in which.

DETAILED DESCRIPTION OF THE PREFERRED EMBODIMENT

The primary and secondary mirrors are furnished with aspheric reflecting surfaces by means of computer-controlled machining. The quality of these surfaces are such that for an f/1 system having a focal length of 75 mm, the angular aberration blur size is less than 1 mrad. The aspheric shape is either machined directly in the aluminum mirror, or follows an electroless nickel deposition onto a rough-machined aluminum mirror. The final surface may be lightly polished and provided with a vacuum-deposited gold reflecting coating. Invar spacer rods are used to maintain precise separation between the primary and secondary mirrors following optical alignment.

Subsequent to the machining of the aspheric surfaces, further mirrors may be prepared by established replication processes.

Figure 3:
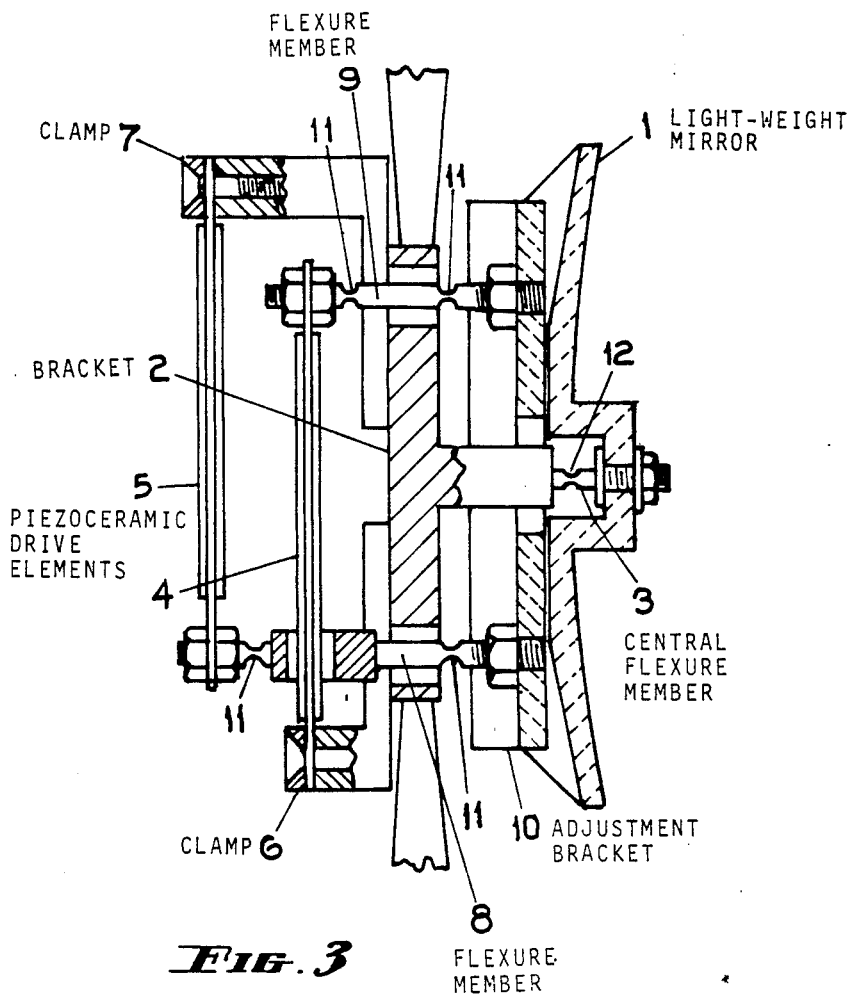
FIG. 3 is a central sectional view of the piezoelectric drive unit.

Whilst various configurations of the piezoelectric drive unit have been deviced, the basic concept can be understood from FIG. 3. The lightweight mirror 1 is mounted on bracket 2 by means of a central flexure member 3. Two piezoceramic drive elements 4 and 5 are held in clamps 6 and 7. The opposite ends of the drive elements are connected to dual flexure members 8 and 9 which in turn are connected to the mirror 1 through a load adjustment bracket 10. Application of a voltage to one or both of the drive elements produces a cantilever action which forces the mirror 1 to turn about the axis of the central flexure member 3. An oscillating voltage causes the mirror to vibrate at the frequency of the applied voltage. The flexure members 8 and 9 have opposed notches 11 at each end portion to allow flexing in a required plane. The central flexure member has only two opposed notches 12 to form a pivot normal to the flexure member 3.

It is possible with this general arrangement to produce a forced vibration of the mirror at the desired frequency. However, this method of operation may require a large applied voltage, which could necessitate the use of transformers to step-up the voltage from associated power sources.

A convenient technique is to design and construct the mirror assembly in such a fashion that mechanical resonance is achieved at the desired scan frequency. In this manner an oscillating voltage at the mechanical resonant frequency will produce a large mirror deflection at a low drive voltage. Course mechanical tuning is effected by varying mass loading via the load adjustment bracket 10 in FIG. 3, and fine tuning is achieved by adjusting the effective drive length of the piezoceramic elements 4 and 5.

Figure 2:
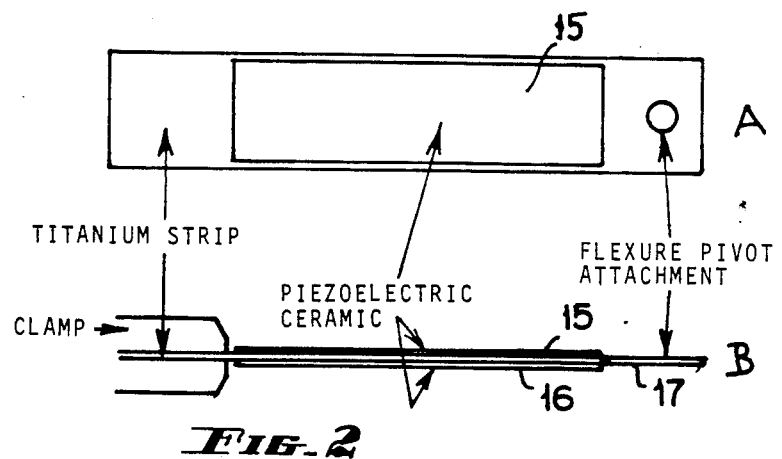
FIG. 2 shows details of a piezoceramic drive element in plan (A) and side elevation (B)

The piezoceramic drive elements are comprised of two lead-zirconate-titanate (PZT) rectangular piezoceramic slabs 15 and 16, bonded one on each side of a metal strip 17 as illustrated in FIG. 2. The metal strip may be aluminum, steel or titanium; however, titanium is preferred for reasons of rigidity and lightness. The dimensions of this trilaminar bender design are chosen according to theory to meet the electro-mechanical drive requirements of the scan unit assembly. Simple bilaminar bender designs, consisting of either two piezoceramic slabs or a single slab bonded onto a metal strip, have also been investigated, but were found to be less suitable than the trilaminar construction.

The mirror can be made to vibrate by applying voltages of appropriate phase to both piezoceramic elements in parallel. However, a convenient arrangement is to drive one element only. The second element then provides mechanical compensation and produce an electrical reference signal for the associated electronic drive circuit.

Scan units constructed as described herein have been operated at frequencies from 50 to 1000 Hz. For a resonant system mechanically turned to 100 Hz, the typical angular mirror deflection is $\pm\frac{1}{3}$ mrad per volt (rms). Since a scan amplitude in the range 0.5 to 5 mrad would satisfy most requirements concerned with focal plane detector arrays, the drive voltage can be readily derived from microelectronic circuits.

Figure 1:
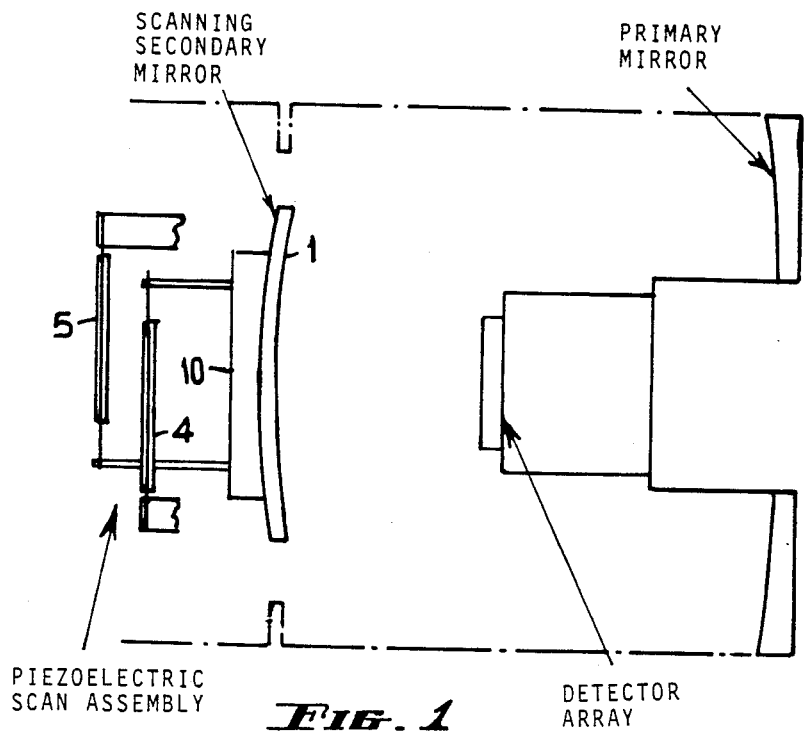
FIG. 1 shows schematically a general arrangement of a preferred embodiment of the present invention.

It should be understood that optical systems of the Cassegrain type have been widely used for many years, and methods of generating aspheric surfaces in metal mirrors are well know. The trilaminar piezoceramic bender design has also been previously described. This invention deals with the construction of a low cost optical system, used in conjunction with the novel scan technique described herein to produce maximum optical coverage at the focal plane for large arrays of infrared detectors. It may be noted, however, that the scan concept is not restricted to the simple optical arrangement shown in FIG. 1, but can be employed with other optical designs, and with systems operated in the visible region of the spectrum.

From the foregoing it will be seen that the invention comprises an optical system specifically of the Cassegrain type wherein one of the optical components is caused to vibrate by virtue of a piezoelectric drive unit as described herein, thereby causing the optical field of view to execute an oscillating motion at the focal plane.

A feature is an optical scan technique wherein a mirror or lens component of the optical system is caused to vibrate by means of piezoceramic bender elements operated in cantilever fashion and connected to the said component via flexure members, such vibration producing an image scan motion in the focal plane of the optical system.

Such an optical system can be used with an array of infrared detectors positioned at the focal plane.

I claim:

1. A focal plane scanning device arranged to move a mirror in an optical scanning device such as an infrared scanner wherein the mirror is mounted to be angularly displaced by means of a piezoelectric assembly comprising a piezoelectric member connected to said mirror by means of a first flexure member to support said mirror on a support bracket to allow the mirror to be tilted about a selected axis relative to said support bracket and a piezoelectric drive element carried on said support and connected to said mirror, characterized by a pair of piezoceramic elements arranged generally parallel to the plane of said mirror, each piezoelectric element connected at one end to said support bracket and extending in opposite directions past a first flexure member which supports said mirror, and by flexure members, one on the other end of each of said piezoceramic elements, connecting that piezoceramic element to said mirror remote from said first flexure member, whereby a balanced movement of said mirror about said first flexure member results when at least one of said piezoceramic members is energized.

2. A focal plane scanning device according to claim 1 wherein said mirror is held against an adjustment bracket and located by a central flexure member secured to a bracket forming said support, and said piezoceramic elements are rigidly held at their one said end to said bracket by clamps and are connected at their other side ends by flexure pivots to said adjustment bracket.

3. A focal plan scanning device according to claim 2 wherein the said flexure members comprise rods threaded at each end and having opposed notches near each end adapted to allow flexing in a plane normal to the axis of the said rod, one of said flexure members being apertured to allow the other piezoceramic element to project therethrough.

4. A focal plane scanning device as in claim 3 characterized in that the mirror and adjustment bracket are arranged to have a mechanical resonance at a desired scan frequency whereby to minimize drive required by said piezoceramic elements.

5. A focal plane scanning device as in claim 2 characterized in that the mirror and adjustment bracket are arranged to have a mechanical resonance at a desired scan frequency whereby to minimize drive required by said piezoceramic elements.

6. A focal plane scanning device according to claim 1, characterized in that said mirror and adjustment bracket are arranged to have a mechanical resonance at a desired scan frequency whereby to minimize drive required by said piezoceramic elements.

7. A focal plane scanning device as defined in claim 1 wherein one of said piezoceramic elements only is electrically driven and the other said piezoceramic drive element is arranged to provide mechanical compensation and optionally produces an electrical reference signal for an associated electronic drive circuit.

8. A focal plane scanning device as defined in claim 1 wherin both of said piezoceramic elements are electrically driven but in opposite phase.

* * * * *